(12) United States Patent
Roehle

(10) Patent No.: US 6,196,251 B1
(45) Date of Patent: Mar. 6, 2001

(54) GAS INLET DEVICE FOR A COATING SYSTEM

(75) Inventor: Helmut Roehle, Berlin (DE)

(73) Assignee: AIXTRON Semiconductor Technologies GmbH (DE)

(*) Notice: Subject to any disclaimer, the term of this patent is extended or adjusted under 35 U.S.C. 154(b) by 0 days.

(21) Appl. No.: 09/068,077

(22) PCT Filed: Nov. 1, 1996

(86) PCT No.: PCT/EP96/04729

§ 371 Date: May 4, 1998

§ 102(e) Date: May 4, 1998

(87) PCT Pub. No.: WO97/16664

PCT Pub. Date: May 9, 1997

(30) Foreign Application Priority Data

Nov. 2, 1995 (DE) .................................. 19540771

(51) Int. Cl.[7] .................................. G05D 16/20
(52) U.S. Cl. ........................... 137/102; 137/487.5
(58) Field of Search ..................... 137/102, 487.5

(56) References Cited

U.S. PATENT DOCUMENTS

| | | | |
|---|---|---|---|
| 4,395,258 | * 7/1983 | Wang et al. ........................ 604/65 |
| 4,903,722 | 2/1990 | Joseph et al. ........................ 137/209 |
| 4,958,658 | * 9/1990 | Zajac ........................ 137/613 |
| 5,094,260 | * 3/1992 | Stuart et al. ........................ 137/102 |
| 5,257,640 | * 11/1993 | Delajoud ........................ 137/102 X |
| 5,363,872 | * 11/1994 | Lorimer ........................ 137/487.5 X |
| 5,443,087 | * 8/1995 | Myles ........................ 137/102 X |

FOREIGN PATENT DOCUMENTS

| | | |
|---|---|---|
| 3537544C1 | 5/1987 | (DE) . |
| 0337180A2 | 10/1989 | (EP) . |
| WO 93/07451 | 4/1993 | (EP) . |
| 0651189A2 | 3/1995 | (EP) . |

* cited by examiner

Primary Examiner—Gerald A. Michalsky
(74) Attorney, Agent, or Firm—St. Onge Steward Johnston & Reens LLC

(57) ABSTRACT

Disclosed is a gas inlet device comprising a gas reservoir (5), which is connected via a supply line (11) via a supply flow restrictor (10) which can be closed by a supply valve 13). The gas can be supplied into the antechamber (5) via a control valve (6) and a control flow restrictor (4). As the control valve (6) and the supply valve (13) close the antechamber from the outside, there are only minimal fluctuations in pressure during switching. By this means the pressure in the antechamber (5) can be controlled precisely and the gas flow from the antechamber (5) into the supply line (11) can be set with great precision.

16 Claims, 2 Drawing Sheets

GAS INLET DEVICE FOR A COATING SYSTEM

The present invention relates to a gas inlet device for a coating system which is provided with a gas reservoir which is connected to a supply chamber via a supply channel arrangement and whose supply channel arrangement can be closed from the supply chamber by means of a respective supply valve arrangement.

A gas inlet device of this type is known from patent publication DE 35 37 544 C1. This gas inlet device comprises a chain of four-way valves which are each allocated to a reaction gas. The individual four-way valves are connected to each other via two connections respectively in such a manner that the chain formed by the four-way valves has a passage channel which is continuously streamed through by a carrier gas and represents the supply chamber of the gas inlet device. The passage channel opens into a reaction vessel in which the material to be coated is located. The gas reservoir allocated to each four-way valve is connected via a gas reservoir line to a third connection of each four-way valve. A fourth connection of the four-way valves is connected to an exhaust channel. A first valve plunger disposed in the passage channel seals the gas reservoir line to the passage channel. The gas reservoir line is sealed to the exhaust channel by a second valve plunger operating in a push-pull manner to the first valve plunger.

The known gas inlet device is employed predominantly in processes such as gas phase epitaxy or molecular beam epitaxy to supply the reaction vessel with the reaction gases needed to carry out the coating. Very important is that the reaction gases are fed into the reaction vessel with great precision with regard to amounts and time.

As the push-pull operating manner of the first and second valve plungers only switches the gas flow from the gas reservoir between the passage channel and the exhaust channel, practically no fluctuations in pressure occur in the gas reservoir line nor in the gas reservoir. Moreover, the switching delays due to dead volume can be ignored, because the opening of the reaction gas line into the passage channel can be closed by the first valve plunger from the passage and because the components of the four-way valve located in the passage channel are continuously swept with the carrier gas.

Consequently, such a gas inlet permits switching the reaction gas flows close to real time and with great accuracy.

However, one drawback of the known gas inlet device is the high gas loss, which occurs when the gas is deflected in the gas line when the first plunger seals the gas reservoir line against the passage channel.

Based on this state of the art, the object of the present invention is to create a gas inlet device with which the flow of the gas to be fed into the supply line can be switched with high accuracy and close to real time without significant losses in gas.

This object is solved in that the supply channel arrangement is designed as a supply flow restrictor arrangement and that the gas pressure in the gas reservoir is adjustable with the aid of a pressure meter and is adjusted by a control flow restrictor arrangement which is connected to a gas source and which can be closed from the outside by means of a control valve arrangement controlled by the pressure meter.

Due to the fact that both the supply valves of the supply valve arrangement and the control valves of the control valve arrangement are closed from the outside, the volume of the gas reservoir is not changed by the switching procedures of the control valves and the supply valves. Consequently, the gas pressure in the gas reservoir also does not change appreciably by actuating the control valves or the supply valves. In this manner the gas pressure can be easily maintained (very precisely) constant with the aid of an accurate pressure meter and a regulating means. As a consequence that the gas reservoir is directly connected via the supply flow restrictor to the supply chamber, in the open state of the supply valves, the gas flow is determined with high accuracy. Moreover, as there is no dead volume, the gas flow can be switched on and off practically instantaneously.

In a preferred embodiment, the supply valve arrangement comprises a number of supply valves with which a supply flow restrictor allocated to each supply valve and connected to the gas reservoir can be closed, thereby permitting setting the gas flow from the gas reservoir into the supply chamber to multiple differing flow values or switching the gas flow in steps.

Other objects, advantages and novel features of the present invention will become apparent from the following detailed description of the invention when considered in conjunction with the accompanying drawings.

DETAILED DESCRIPTION OF THE DRAWINGS

Figure 1:
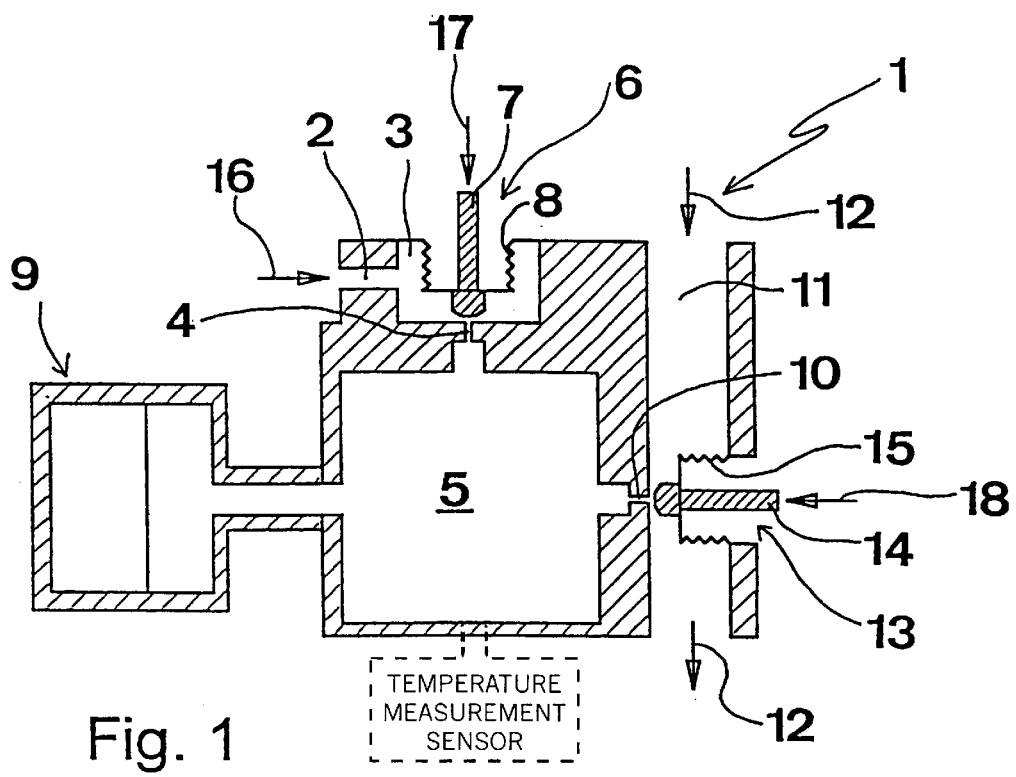
FIG. 1 a preferred embodiment of the gas inlet device according to the present invention.

FIG. 1 shows a gas inlet device 1 which is connected via a supply line 2 to a gas source, which is not depicted in the drawing. The reaction gas reaches from the gas source through the supply line 2 into a control valve chamber 3 and from there via a control flow restrictor 4 into an antechamber 5. The inlet opening of the control flow restrictor 4 not facing the antechamber 5 forms a part of a control valve 6 and can be closed with the aid of a control valve plunger 7. The control valve plunger 7 is sealed to the outside via a control valve bellows 8 adjacent to the head of the control valve plunger 7 and attached with its opposite end to the wall of the control valve chamber 3. A pressure meter 9 measures the pressure inside antechamber 5. The measuring output of the pressure meter 9 is connected to a pressure control, which is not depicted in the drawing and which actuates the control valve 6 after comparing the measured pressure value with a desired value.

Antechamber 5 is connected via a supply flow restrictor 10 to a supply line 11 leading to a not depicted coating container for the coating material. A carrier gas streams through the supply line 11 in the direction of an arrow 12. The supply flow restrictor 10 forms a part of a supply valve 13 and can be closed via a supply valve plunger 14 disposed in the supply line 11. The supply valve plunger 14 is sealed to the outside via a supply valve bellows 15 adjacent to the head of the supply valve plunger 14 and attached with its opposite end to the wall of the supply line 11.

The reaction gas streams out of the gas source along arrow 16 into control valve chamber 3. The pressure control for control valve 6 compares the measured value of the pressure in antechamber 5 with a corresponding desired value and adjusts control valve 6 via an actuating force 17 in such a manner that the pressure in antechamber 5 is maintained at the desired value. In order for pressure regulation to be rapid enough, the opening of control flow restrictor 4 is larger than the opening of supply flow restrictor 10. Usually the pressure in antechamber 5 lies in the range of 10 to 1000 millibar so that the free distance covered by the gas molecules is within the region of the internal dimensions of antechamber 5.

The supply flow restrictor 10, which is formed by an opening in a common wall section of antechamber 5 and supply line 11, lets a gas flow proportional to the pressure in the antechamber 5 stream into the supply line 11. The gas streamed into the supply line 11 is then conveyed via the carrier gas flow 12 in direction of the coating container. The proportionality is applied as long as the pressure in the antechamber 5 is at least twice as big as the pressure in the coating container. If the temperature of the gas inlet device 1 and, in particular, of the antechamber 5 is not constant, the temperature of the antechamber 5 has to be measured and its square root shaped influence on the gas flow has to be taken into account. This can occur automatically if an intelligent pressure control is provided to actuate control valve 6, which sets the pressure in antechamber 5 in dependence of the temperature in such a manner that the desired gas flow sets in at supply flow restrictor 10.

The arrangement of the control valve plunger 7 and the supply valve plunger 14 is essential for the operation of the gas inlet device 1. As the control valve plunger 7 and the supply valve plunger 14 are located outside the antechamber 5, actuating the control valve plunger 7 and the supply valve plunger 14 does not alter the volume of the antechamber 5 and therefore its inside pressure. As the pressure fluctuations in the antechamber 5 are small, the pressure in the antechamber 5 can be measured with great accuracy. For instance, a capacitance pressure sensor can be employed as the pressure meter 9 whose capacity value linked to the pressure in the antechamber 5 can be measured by a measuring bridge. As the pressure fluctuations in the antechamber 5 and therefore the fluctuations of the capacity value of the capacitance pressure sensor are small, a measuring amplifier, which has a great amplification value and which converts even small changes in the capacity value into relatively large voltage signals, can be connected to the measuring bridges, permitting very precise regulation of the pressure in the antechamber 5.

Moreover, after closing the supply valve 13 no dead volume needs to be emptied or refilled after opening the supply valve 13 so that the desired flow is immediately available. Accordingly, the gas flow can be immediately interrupted and released with the aid of supply flow restrictor 10 and the supply valve plunger 14. The size of the supply valve bellows 15 surface facing the inside of the supply line 11 is also not a drawback, because the carrier gas streaming in the supply line 11 continuously rinses these surfaces free.

Figure 2:
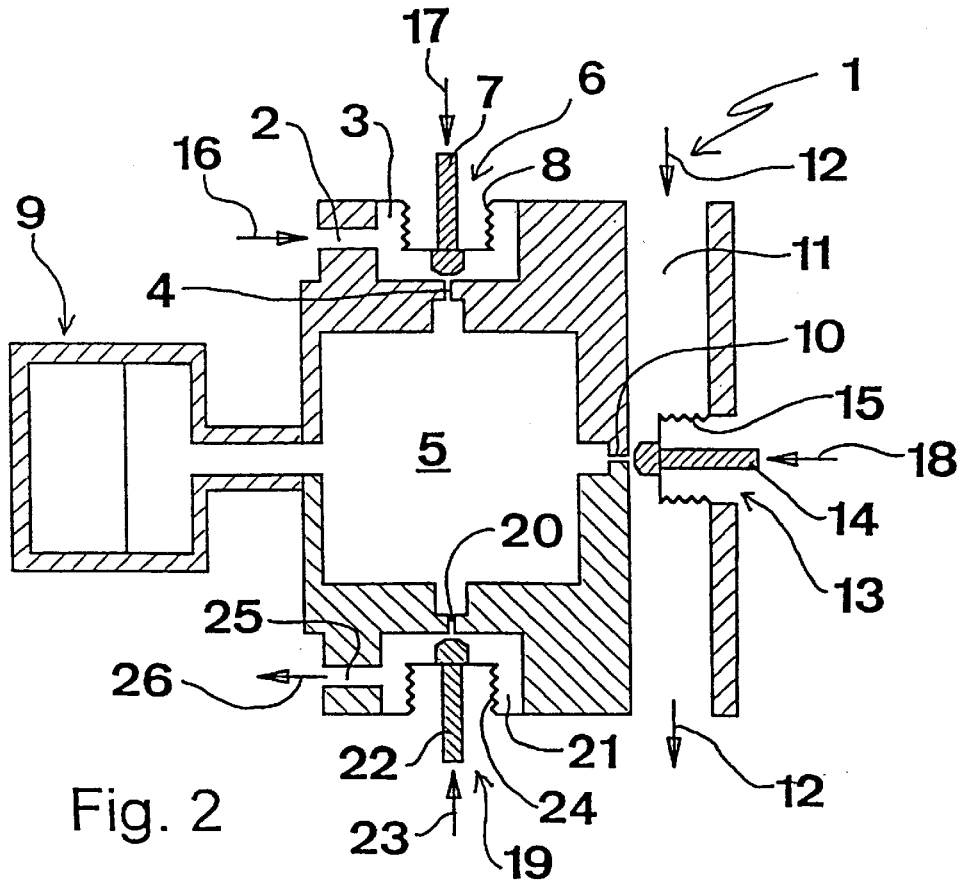
FIG. 2 another preferred embodiment of the gas inlet device which, compared to the preferred embodiment of FIG. 1, also has a drain valve added.

FIG. 2 shows a modified preferred embodiment of the gas inlet device 1, which has a drain valve 19 added. The drain valve 19 is formed by a drain flow restrictor 20 which is formed by an opening in the wall of the antechamber 5. The drain flow restrictor 20 ends in drain chamber 21. A drain valve plunger 22, with which the opening of the drain flow restrictor 20 can be closed with the aid of an actuating force 23, is located in drain chamber 21. The drain valve plunger 22 is sealed to the outside by a drain valve bellows 24 attached to the head of the drain valve plunger 22 and with its opposite end to the wall of the drain chamber 21.

The drain valve 19 permits obtaining quick transition from a high to a low gas flow. By means of the drain valve 19, the reaction gas contained in the antechamber 5 can be let off in a drain line 25 in the direction of arrow 26. The drain valve 19 is then briefly opened independent of the operating state of the supply valve 13 if lowering the gas flow is necessary. The resulting loss of gas is negligibly small.

Figure 3:
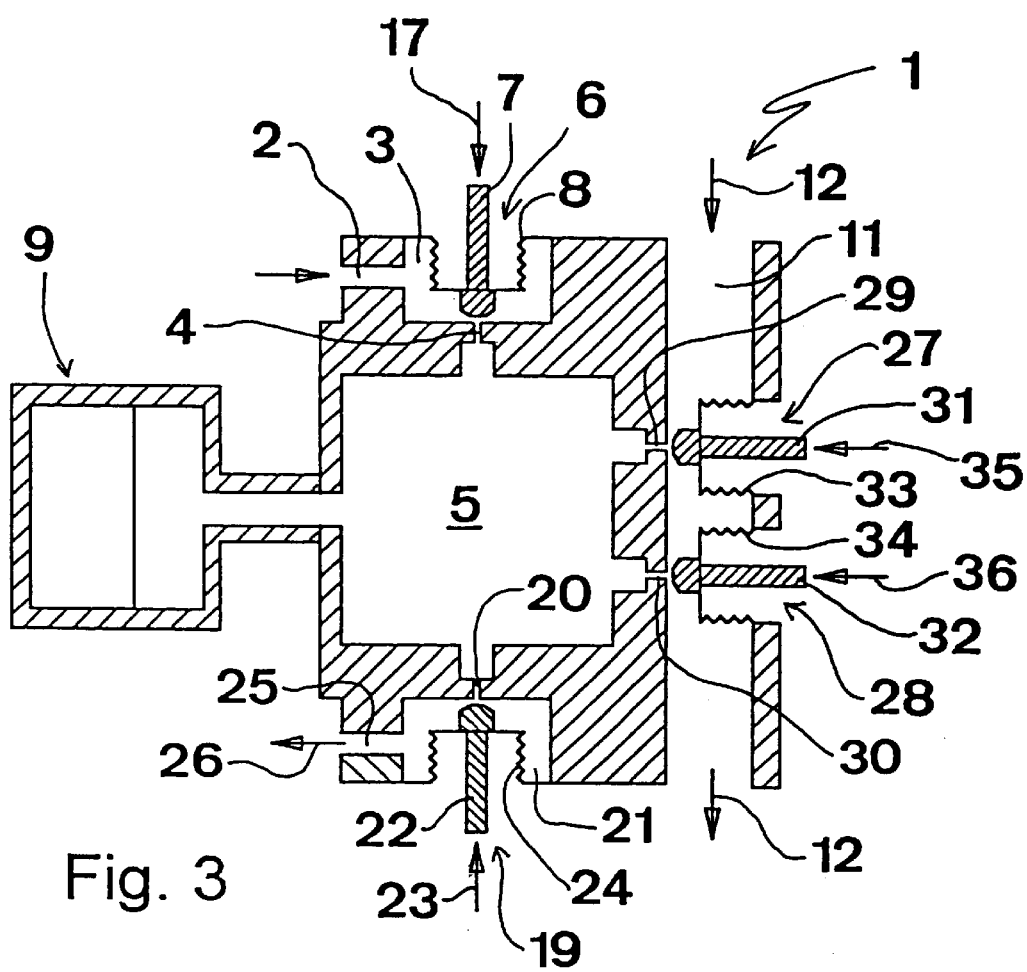
FIG. 3 a modified preferred embodiment of the gas inlet device having multiple supply valves.

FIG. 3 shows another preferred embodiment of the gas inlet device 1 which is provided toward the supply line 11 with a first supply valve 27 and a second supply valve 28 having a first and second supply flow restrictor 29 and 30 and a first and second supply valve plunger 31 and 32. The first and the second supply valves 31 and 32 are sealed to the outside by supply valve bellows 33 and 34 respectively. With the aid of a first actuating force 35 and a second actuating force 36 both the first supply valve 27 and the second supply valve 28 can be closed. The openings of the first supply flow restrictor 29 and the second supply flow restrictor 30 can be selected of different size so that different flow values are possible by opening both supply valves 27 and 28 or one of the two supply valves 27 and 28.

It is to be remarked that the openings of the control flow restrictor 4, of the drain flow restrictor 20 and the supply flow restrictor 10, 29 and 30 can be obtained by shutters which can be screwed into the basic body of the antechamber 5, permitting in this way adaptation of the control valve 6, the drain valve 19 and the supply valves 13, 27 and 28 to the different flow values. Useful is also if the control valve plunger 7, the drain valve plunger 22 and the supply valve plungers 14, 31 and 32 in conjunction with the control valve bellows 8, the drain valve bellows 24 and the supply valve bellows 15, 33 and 34 are designed so that they can be screwed so that the flow restrictor shutters are easily accessible from the outside if they have to be replaced.

Furthermore, it is fundamentally possible to provide multiple openings of different sizes serving as supply flow restrictor. A first supply flow restrictor is to be dimensioned, by way of illustration, in such a manner that a flow of F is yielded by the first supply flow restrictor. A second supply flow restrictor delivers a flow of 2F and a third supply flow restrictor a flow of 4F. This supply flow restrictor arrangement permits setting eight flow values between 0F and 7F in steps of 1F.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A gas inlet device to supply a reaction gas to a reaction chamber, comprising:

a control chamber to receive the reaction gas from a reaction gas source;

at least one control valve, each comprising a control flow restrictor;

a gas reservoir into which the reaction gas passes from the control chamber through the control flow restrictor, the gas reservoir having at least one wall;

a gas pressure gauge to measure gas pressure in the gas reservoir and control the control valve to set the gas pressure in the gas reservoir at a desired value;

a supply chamber to convey the reaction gas to the reaction chamber; and at least one supply valve, each comprising:
- a supply flow restrictor provided in a wall of the gas reservoir, to convey the reaction gas from the gas reservoir to the supply chamber, the supply flow restrictor having an external opening facing away from the gas reservoir;
- a supply valve plunger positioned outside of the gas reservoir to open and close the external opening of the supply flow restrictor; and
- a supply seal to seal the supply valve plunger and the supply chamber.

2. A gas inlet device according to claim 1, wherein the control flow restrictor is provided in a wall of the gas reservoir and has an external opening facing away from the gas reservoir.

3. A gas inlet device according to claim 2, wherein the control valve further comprises a control valve plunger positioned outside of the gas reservoir to open and close the external opening of the control flow restrictor.

4. A gas inlet device according to claim 3, wherein each control valve further comprises a control seal to seal the control valve plunger and the control chamber.

5. A gas inlet device according to claim 4, wherein the control valve plunger is sealed from outside the gas reservoir by a control valve bellows adjoining a head of the control valve plunger and attached at an opposite end to a wall of the feed line.

6. A gas inlet device according to claim 1, wherein an overall cross section of the control flow restrictors is greater than an overall cross section of the supply flow restrictors.

7. A gas inlet device according to claim 1, further comprising:
- at least one drain flow restrictor, each being provided in a wall of the gas reservoir and having an external opening facing away from the gas reservoir; and
- at least one drain valve to open and close the at least drain flow restrictor from outside of the gas reservoir.

8. A gas inlet device according to claim 7, wherein each drain valve has a drain valve plunger with which the external opening of the associated drain flow restrictor can be closed and which is sealed from outside of the gas reservoir by a drain valve bellows adjoining a head of the drain valve plunger and attached at its opposite end to a wall of a drain line.

9. A gas inlet device according to claim 1, wherein the supply valve plunger is sealed from outside the gas reservoir by a supply valve bellows mounted to a head of the supply valve plunger and attached at its opposite end to a wall of the supply chamber.

10. A gas inlet device according to claim 1, wherein the pressure gauge is a capacitance pressure sensor which controls the control valve via a regulating means.

11. A gas inlet device according to claim 10, wherein a temperature measuring sensor is provided to measure a temperature of the gas in the gas reservoir and send an output signal to the regulating means for setting the pressure in the gas reservoir according to the temperature of the gas in the gas reservoir for a constant gas flow into the supply line.

12. A gas inlet device according to claim 10, wherein the control chamber receives the reaction gas from a supply line, and
the regulating means sets the pressure in the gas reservoir to at least twice the pressure in the supply line.

13. A gas inlet device according to claim 1, wherein at least two supply valves are provided, each having an associated supply flow restrictor, supply valve plunger and supply seal.

14. A gas inlet device according to claim 13, wherein a first supply flow restrictor has a size different from that of a second supply flow restrictor.

15. A gas inlet device according to claim 1, wherein a carrier gas steam is sent through the supply chamber to carry the reaction gas to the reaction chamber.

16. A gas inlet device to supply a reaction gas to a reaction chamber, comprising:
- a control chamber to receive the reaction gas from a reaction gas source;
- a gas reservoir into which the reaction gas passes from the control chamber, the gas reservoir having at least one wall;
- at least one control valve, each comprising:
  - a control flow restrictor provided in a wall of the gas reservoir, to convey the reaction gas from the control chamber to the gas reservoir, the control flow restrictor having an external opening facing away from the gas reservoir;
  - a control valve plunger positioned outside of the gas reservoir to open and close the external opening of the control flow restrictor; and
  - a control seal to seal the control valve plunger and the control chamber;
- a gas pressure gauge to measure gas pressure in the gas reservoir and control the control valve to set the gas pressure in the gas reservoir at a desired value;
- a supply chamber to convey the reaction gas to the reaction chamber; and
- at least one supply valve, each comprising a supply flow restrictor.

* * * * *